United States Patent [19]

Bendler

[11] 4,144,714

[45] Mar. 20, 1979

[54] ROTARY POWER ELEMENT

[75] Inventor: Hellmut Bendler, Fürth, Fed. Rep. of Germany

[73] Assignee: Dynamit Nobel Aktiengesellschaft, Fed. Rep. of Germany

[21] Appl. No.: 837,441

[22] Filed: Sep. 28, 1977

[30] Foreign Application Priority Data

Oct. 1, 1976 [DE] Fed. Rep. of Germany ....... 2644315

[51] Int. Cl.² ............................................. F01B 29/00
[52] U.S. Cl. ..................................................... 60/632
[58] Field of Search .................... 60/632, 636, 638; 227/9

[56] References Cited

U.S. PATENT DOCUMENTS

| 3,031,845 | 5/1962 | Ludwig | 60/632 |
| 3,111,808 | 11/1963 | Fritz | 60/636 X |

Primary Examiner—Edgar W. Geoghegan
Attorney, Agent, or Firm—Craig & Antonelli

[57] ABSTRACT

A rotary power element has a compressed-gas generator having a liquid for actuation of a rotary drive element. The liquid for actuation of the drive element is sealed within a pipe by bursting elements. In a preferred embodiment the pipe is curved into a coil surrounded by an external supporting sleeve.

14 Claims, 3 Drawing Figures

ROTARY POWER ELEMENT

BACKGROUND OF THE INVENTION

This invention relates to a rotary power element of the type used in safety mechanisms for the protection of the occupants of conveyances such as safety belts.

A safety belt for protecting the occupants of conveyances, for example, airplanes or automotive vehicles, is known from DOS [German Unexamined Laid-Open Application] No. 2,121,101 comprising a tensioning mechanism. This tensioning mechanism is triggered in a collision situation by means of a sensor when a predetermined deceleration value has been exceeded and retracts and/or winds up the belt until it is in sufficiently close contact with the occupant's body. Such a sensor has been described, for example, in DOS No. 2,207,831. The tensioning mechanism fashioned as a rotary power element includes a compressed-gas generator and a shaft connected with the end of the belt to be retracted. A turbine impeller is preferably employed as the drive element for the shaft.

The compressed-gas generator actuating the drive element can be, for example, a compressed-air bottle which is under a correspondingly high internal pressure. With a view toward minimum space requirements, however, the compressed-gas generator is preferably provided in the form of a propellant charge, a pyrotechnical charge, or the like, which can be ignited electrically or mechanically by percussion and produce the compressed gases only during their reaction [conversion]. The propellant charge can be composed, for example, of mixtures as indicated in German Pat. No. 1,646,313.

This rotary power element has the advantage over the linear tensioning means for safety belts described, for example, in DOS No. 2,253,657 that the number of revolutions executed by the drive element is basically unlimited, so that, if necessary, it is possible to retract the safety belt also for larger lengths, or very large lengths, thus eliminating any belt slackness. In some practical cases of application, though, with a direct exposure being exerted by the compressed gas on the drive element, the torque transmitted by the drive element to the shaft is unsatisfactory in veiw of the minor density of the compressed gas. In such an instance, it proves to be more advantageous to arrange between the compressed-gas generator and the drive element a cylinder filled, for example, with water, in order to expose the drive element to a water jet of a higher kinetic energy. The water is displaced from the cylinder by means of a piston under the effect of the compressed gas by way of a discharge of a smaller cross section, so that the drive element is here actuated indirectly by the compressed gas. Depending on the spatial arrangement of the cylinder with respect to the drive element, the discharge is fashioned to have a more or less large curvature.

Although it is possible in this way to apply a larger torque evenly over a rather long period of time, the expenditure required for this purpose in the manufacture of the cylinder with a discharge and a piston is undesirably high. Furthermore, the additional water reservoir occupies such a large amount of space and also is of very low adaptability in its shape so that the accommodation of the entire power element is sometimes impossible, particularly if the power is to be arranged as part of a belt tightening means, for example, in the interior of the "B" column (located just to the rear of the front door) of passenger cars.

SUMMARY OF THE INVENTION

The invention is based on the problem of fashioning a rotary power element of the type having a compressed gas generator and a liquid for actuation of the power element so that, in particular, the aforementioned disadvantages are avoided, i.e. the constructional and manufactured design is maximally simple and reliable, and the system can be readily adapted to the varying and, in general, very restricted space conditions in the conveyances, particularly in automobiles.

This problem is solved in accordance with the invention by accommodating the liquid in a pipe which has a sealed discharge end which is associated with the drive element until a predetermined liquid pressure is attained and another end in communication with the compressed gas generator. The pipe is sealed, for example, at its outlet end by means of a spring-loaded ball valve and is in communication with its front end, for example, by way of a screw thread, with the compressed-gas generator being, preferably, a propellant cartridge arranged in a cartridge chamber. The special manufacturing expense which is required, for example, for the cylinder with a discharge means, worked out of a solid material is eliminated inasmuch as commercially available pressure pipes of steel or the like can be employed. Furthermore, due to the very small cross-sectional dimensions of the pipe, the latter can be installed even under very limited space conditions, so long as the installation area has the necessary length to accommodate the pipe, which is straight, for example, and has a length which is sufficient to store the required amount of liquid.

Water is preferably employed as the liquid and, if necessary, an antifreeze agent, a corrosion protection agent, or the like can be added to the water. However, it is also possible to utilize other flowable materials which can be displaced from the pipe under the effect of the compressed gas and which have a correspondingly high density as compared to the gas supplied by the compressed-gas generator. In this connection, merely as examples, the following are worth mentioning: oily fluids, emulsions, or optionally also suspensions, i.e. liquids with solid particles distributed therein. In some cases, the use of a liquid which vaporizes during or after its ejection from the pipe due to lowering of the pressure can also prove advantageous. In this case, but also in the case of other fluids, the drive element can be disposed in a housing surrounding the drive element, i.e. it can be a fully capsulated design. The drive element proper can then be constructed, for example, as a rotary piston wherein the shaft of the drive element to be rotated is provided with a single radial lug, vane, blade or the like. However, such a drive element will execute less than one rotation only, so that, for example in case of a safety belt without the use of additional transmission means, e.g. a gear transmission, the retraction path is correspondingly minor. Therefore, drive elements are preferably used instead which, depending on the duration of exposure to the mass stream, preferably a liquid stream, can execute several or even many revolutions. In particular, turbine impellers are utilized, for example, Pelton impellers, without additional external housings.

To provide a better adaptation to the space conditions existing in a particular case, a suitable embodiment of the invention provides that the pipe is formed with a curvature at least along a portion of its length, for example, at or in the close proximity of the discharge end, in order to obtain a maximally favorable impingement angle of the mass stream on the drive element with a view toward a maximally complete utilization of the kinetic energy. As contrasted to the aforementioned cylinder with piston and a curved discharge, in the pipe of this invention, then, it is not only the inner wall wetted by the liquid which is curved, but at the same time also the external surface of the pipe, with a different radius of curvature dependent on the respective thickness of the pipe wall, so that it is possible by means of the pipe curvature to attain an optimum conductance of the liquid as well as an advantageous adaptation to external space conditions.

In accordance with a further embodiment of this invention the pipe is fashioned as a pipe coil. For this purpose, the pipe can be wound in the shape of a spiral, a truncated cone, or the like; in general, the two pipe ends are excepted from this configuration. Preferably, a helical-type winding is utilized with a linear winding axis wherein adjacent windings are suitably in contact with one another. In principle, in case of a three-dimensional pipe coil, the winding axis can also be, in turn, curved in a plane or three-dimensionally.

If, on account of the dynamic shock stresses caused by the liquid, which is greatly accelerated when the device is triggered, there should be an undesirable dimensional charge of the curved pipe zone along the lines of a straightening action, then an additional fixation of the pipe can be advantageously employed with the pipe attached, for example, in the endangered zone, to the conveyance by means of additional clamps. In case of a pipe coil, the various windings can be joined, for example, by means of screws. However, it is more advantageous instead to join the adjacent windings by gluing, soldering, welding or the like with several spot-type junction points distributed over the circumference normally being sufficient. Another basic form of support suitable, in particular, for a cylindrical pipe coil is achieved by surrounding the pipe by an external supporting sleeve. In this construction, the relatively thin-walled supporting sleeve of a material of corresponding strength, suitably steel, is generally in contact with the individual windings initially, so that practically any radial expansion of the pipe windings is prevented.

The expenditure for the rotary power element can be further reduced advantageously by omitting the piston customarily provided for the shock-like displacement of a liquid from a cylinder by means of gas pressure. According to the invention, the gas acts directly on the liquid and drives the latter out of the pipe in the form of a practically homogeneous column. However, a prerequisite in this connection is that the inside cross section of the pipe, taking into account the properties of the liquid and the gas pressure, should be small enough to prevent a continuous gas channel from forming within the liquid column disposed in the pipe through which a significant part of the compressed gas can escape practically unused. If necessary, the cross-sectional dimension critical in a individual case, which separate the homogeneous liquid stream from the inhomogeneous liquid-gas stream, must be determined by experiment.

To keep expense at a minimum, on the one hand, and to ensure flawless operability even over longer periods of time for example 10 years, the discharge end of the pipe is preferably sealed with a thin metallic bursting disk held at the pipe by means of a screw cap. However, preferably the bursting disk is glued, soldered, welded, or the like, along its circumference to the pipe. Optionally, the bursting disk can also be provided with additional predetermined rupturing zones. However, in place of a metal disk, it is also possible to utilize a disk made of a synthetic resin, glass, or the like.

According to another embodiment, a second bursting element is arranged at the other end of the pipe. This other bursting element is likewise preferably fashioned as a thin metal disk and is clamped between the cartridge chamber of a propellant cartridge and the other pipe end threadedly inserted therein. This feature not only improves the seal with regard to a possible liquid leakage, but also makes it possible to promote the reaction of the propellant powder, a pyrotechnical charge, or the like located in the propellant cartridge. After the function of the device has been triggered, the additional bursting element prevents particles ejected from the cartridge, which have been ignited but have not been burnt up completely, from being flung into the liquid and thus be extinguished, and which as a consequence can no longer contribute anything toward the compressed gas generation. After a predetermined pressure has been reached, this bursting element is likewise destroyed, so that the compressed gas is directly effective on the liquid. This effect can be still further improved by fashioning the other bursting element as a cup-shaped sealing element inserted in the pipe with its open end preferably pointing toward the compressed gas generator. The cup-shaped sealing element may be also inserted in the cartridge chamber, but preferably it is located in the pipe itself, and is pressed radially against the wall by the compressed gas entering this sealing element. By this obturation effect, the initial seal with respect to the compressed gas is additionally improved and the flawless reaction of the propellant powder, the pyrotechnical charge, or the like is promoted.

Preferably, the pipe has a circular cross section, but it could also have, for example, an oval, rectangular, or the like, cross section. Another feature is that the pipe is furthermore formed with an inside cross section which is constant over its entire length so that it does not have a constriction, for example, at the discharge end, either.

These and further objects, features and advantages of the present invention will become more obvious from the following description when taken in conjunction with the accompanying drawings which show, for purposes of illustration only, a single embodiment in accordance with the present invention.

DETAILED DESCRIPTION OF THE INVENTION

Figure 1:
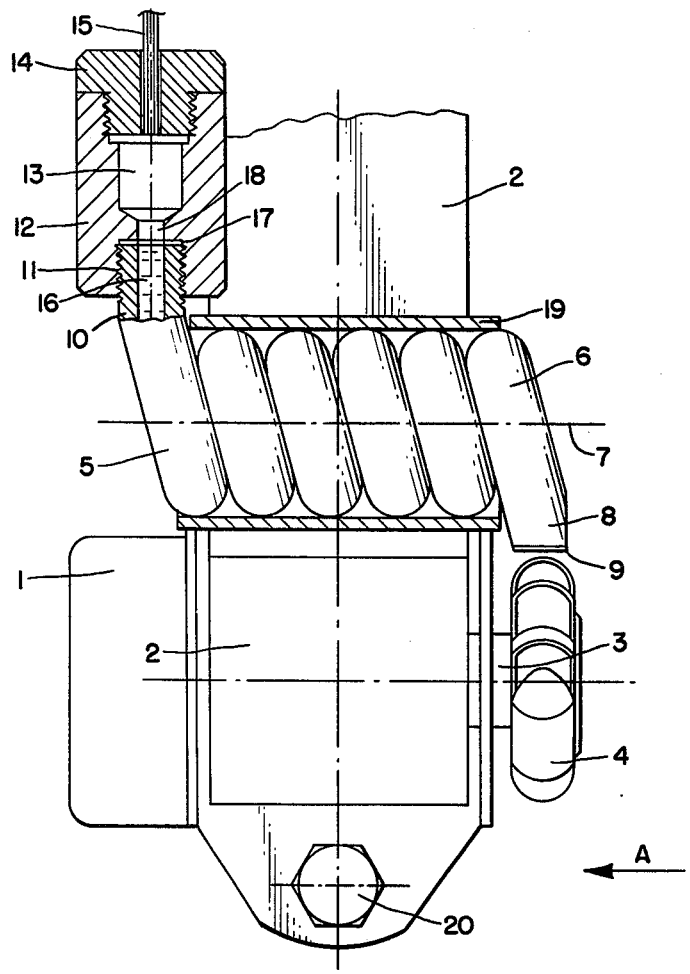
FIG. 1 shows the rotary power element with an automatic belt mechanism in an elevational view and partially in section.

In the automatic belt mechanism 1 with the safety belt 2 shown in FIG. 1, the shaft 3 is laterally extended and firmly joined to the rotatable drive element 4. The drive element 4, fashioned as a turbine impeller, for example, a Pelton impeller, follows, due to its rigid connection with the shaft 3, each movement of the shaft during the ordinary use of the automatic belt. The pipe 5, which is made of steel, for example, and has a circular inside cross section which is very small as compared to its length, is wound into a cylindrical pipe coil 6, the windings of which are in mutual contact. The winding axis 7 of the pipe coil 6 is arranged in this embodiment in parallel to the shaft 3. The pipe 5 terminates with one discharge end 8 above the drive element 4 at a minor spacing from the latter. The discharge end 8 is closed off by means of a thin metal plate 9 welded along its edge to the discharge end and being capable of bursting. The other end 10 of the pipe 5 is firmly secured by means of the thread 11 in the pressure proof cartridge chamber 12; from the other side, the compressed-gas generator 13, in this case a propellant charge cartridge, is inserted in the cartridge chamber. The propellant cartridge 13 is held in the cartridge chamber 12 by means of the threaded ferrule 14 and can be triggered electrically by way of the two ignition lines 15.

The pipe 5 contains the liquid 16, preferably water with an antifreeze agent. On its other end 10, the pipe is sealed by means of the metallic bursting disk 17. In the free space 18 between the compressed-gas generator 13 and the liquid 16, there is no piston. The bursting disk 17 is destroyed before the bursting element 9 at the discharge end 8 of the pipe 5, so that the disk does not act as a piston, i.e. the compressed gas is directly effective on the liquid 16. To avoid an untwisting of the pipe coil 6 under the stress of the dynamic pressure, the pipe coil is surrounded by the outer supporting sleeve 19 of steel, for example. The windings of the pipe coil 6 contact directly the inner wall of the supporting sleeve 19. The two essentially straight ends of pipe 5 are disposed outside of the supporting sleeve 19. The screw 20 serves for attaching the automatic belt mechanism with the rotary power element within the automotive vehicle.

Figure 2:
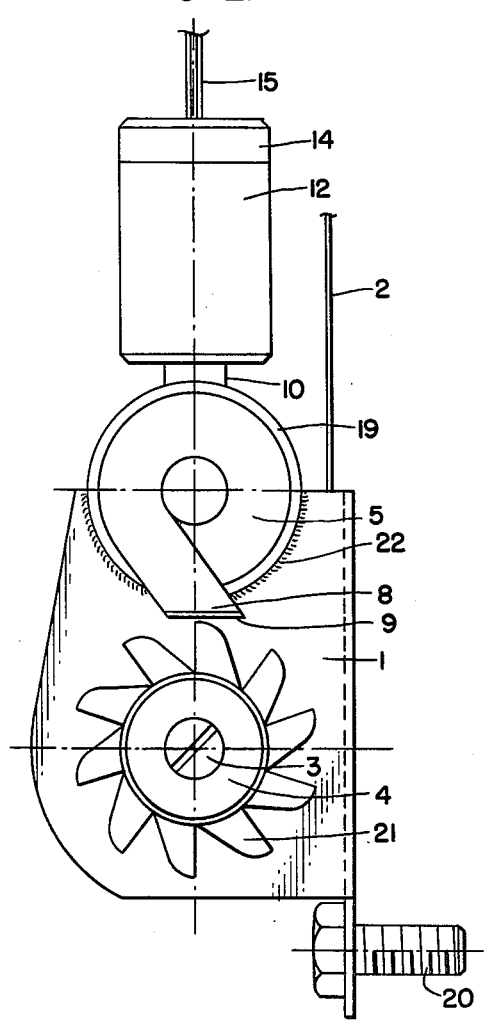
FIG. 2 is a view in the direction of arrow A in FIG. 1.

The lateral view of FIG. 2 clearly shows the inclined arrangement of the discharge end 8 of pipe 5 with respect to the drive element 4, which latter is fashioned as a turbine impeller with blades 21. The rotary power element is, for example, directly attached to the automatic belt mechanism 1 by welding its supporting sleeve 19 to the two lateral parts of the automatic belt mechanism 1, for example, along the edge 22. In this connection, the pipe coil 6 is also additionally welded to the supporting sleeve 19, if desirable. With respect to the significance of the other reference numerals, attention is directed to FIG. 1.

Figure 3:
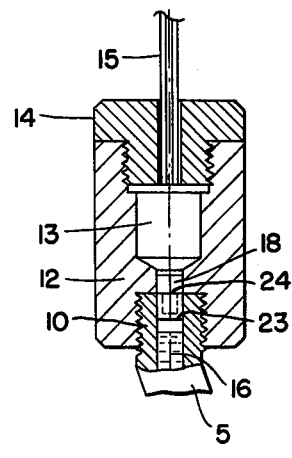
FIG. 3 is a modification concerning the end on the side of the compressed-gas generator.

In the cartridge chamber 12 shown in FIG. 3, where the pipe 5 is threadedly inserted in the cartridge chamber, the cup-shaped sealing element 23 is inserted in the other end 10 of the pipe 5, to serve as the bursting element, in such a way that this sealing element points with its open end 24 toward the compressed-gas generator 13.

The function of the rotary element is as follows:

After triggering effected in a crash situation by a sensor installed in the automotive vehicle, the propellant cartridge 13 is ignited electrically. The compressed gas produced by the cartridge acts, after destruction of the bursting disk 17 and/or the cup 23, on the liquid 16. Under the effect of the liquid pressure, the bursting element 9 then is ruptured and releases the liquid 16. The liquid jet acts on the turbine impellers 21 which set the drive element 4 into rotation. Thereby, the shaft 3 of the automatic belt mechanism 1 is rotated, and the belt slackness is eliminated at a restraining force of 2,000 to 3,000 N [= Newtons = kiloponds]. By means of this arrangement, the occupant of an automotive vehicle is restrained in a crash situation before the person to be protected commences his forward movement.

In connection with tensioning devices for safety belts, pipes having a free inside diameter of between about 8 mm. and 20 mm. with a length of about 200–400 mm. have proven themselves well. The wall thickness of these pipes, manufactured from steel ordinarily utilized for pressure pipes, is between about 0.5 mm. and 2 mm.

The rotary power element of this invention, described hereinabove by using an automatic safety belt as an example, can, of course, also be utilized in conjunction with rigid safety belts in vehicles, airplanes, or the like. However, the use of the rotary power element is nowise limited to safety belts, safety nets, and similar safety devices and which are to be tensioned in case of an accident situation in conveyances as the use of such a rotary power element is, in principle, of advantage in all cases where, in response to a signal, kinematic processes are to be executed, during the course of which a rotational movement occurs. For example, such processes can involve the coiling of ropes, the tensioning of spiral springs, the starting procedure of reciprocating engines, or also other translatory motion processes initiated by way of a rotary movement with the interposition of a gear rack or the like.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modification as are encompassed by the scope of the appended claims.

I claim:

1. A rotary power mechanism comprising a rotary drive element, a compressed gas generator, and a liquid for actuation of said drive element, characterized in that a pipe is provided, said pipe having a first sealed discharge end and second end in communication with said compressed gas generator, said liquid being contained within said pipe, and said rotary drive element being located adjacent said discharge end.

2. A rotary mechanism according to claim 1, wherein said drive element is operatively connected to a safety belt for applying a tensioning force thereto under action of said liquid.

3. A rotary mechanism according to claim 1, wherein said drive element is a turbine impeller.

4. A rotary power mechanism according to claim 1, characterized in that the pipe is curved at least along part of its length.

5. A rotary power mechanism according to claim 4, characterized in that the pipe is curved into a pipe coil which has a helical configuration.

6. A rotary power mechanism according to claim 4, characterized in that the pipe is fixed in the area of said curved part by means of at least one external mounting means, support means, or the like.

7. A rotary power mechanism according to claim 5, characterized in that the windings of the pipe coil are bonded, to one another.

8. A rotary power mechanism according to claim 5, characterized in that the pipe coil is surrounded by an external supporting sleeve.

9. A rotary power mechanism according to claim 1, characterized in that a space exists between the compressed-gas generator and the liquid, and no piston is provided for displacing the liquid.

10. A rotary power mechanism according to claim 1, characterized in that a bursting element is provided, said bursting element being mounted on said pipe so as to seal its discharge end.

11. A rotary power mechanism according to claim 10, wherein said bursting element is metallic.

12. A rotary power mechanism according to claim 10, characterized in that a second bursting element, which is destroyed at a predetermined pressure, is arranged between the compressed-gas generator and the other end of the pipe.

13. A rotary power mechanism according to claim 12, characterized in that the second bursting element is fashioned as a cup-shaped sealing element inserted in the pipe, said sealing element pointing with its open end toward the compressed-gas generator.

14. A rotary power mechanism according to claim 1, characterized in that the pipe has a constant inside cross section over its length.

* * * * *